Dec. 10, 1957  J. P. WATSON  2,815,668
GYROSCOPE

Filed March 17, 1955  5 Sheets-Sheet 1

INVENTOR,
JAMES P. WATSON
Huebner, Beehler, Worrel & Herzig
BY
Warren T. Jessup
ATTORNEYS.

Dec. 10, 1957  J. P. WATSON  2,815,668
GYROSCOPE
Filed March 17, 1955  5 Sheets-Sheet 2

JAMES P. WATSON,
INVENTOR.
Huebner, Beehler, Worrel & Herzig
BY
Warren T. Jessup
ATTORNEYS.

Dec. 10, 1957  J. P. WATSON  2,815,668
GYROSCOPE

Filed March 17, 1955  5 Sheets-Sheet 3

JAMES P. WATSON,
INVENTOR.
Huebner, Beehler, Worrel & Herzig
BY
Warren T. Jessup
ATTORNEYS.

Dec. 10, 1957    J. P. WATSON    2,815,668
GYROSCOPE
Filed March 17, 1955    5 Sheets-Sheet 4

JAMES P. WATSON,
INVENTOR.
Huebner, Beehler, Worrel & Herzig
BY

ATTORNEYS.

Dec. 10, 1957  J. P. WATSON  2,815,668
GYROSCOPE
Filed March 17, 1955  5 Sheets-Sheet 5

JAMES P. WATSON,
INVENTOR.
Huebner, Beehler, Worrel & Herzig
BY
Warren T. Jessup
ATTORNEYS.

United States Patent Office 2,815,668
Patented Dec. 10, 1957

2,815,668
GYROSCOPE
James P. Watson, Lynwood, Calif.
Application March 17, 1955, Serial No. 495,021
21 Claims. (Cl. 74—5.1)

This invention relates to means and method for caging a gyroscope particularly when the spin motor or gyroscopic element is either dormant or operating at such low speed that precessive forces do not enter significantly into the caging operation.

This application is a continuation-in-part of co-pending application Ser. No. 417,598, filed March 22, 1954, in the name of James P. Watson, now Patent No. 2,732,-719, issued January 31, 1956. The invention disclosed herein has particular application to a gyroscope of the type illustrated in said application Ser. No. 417,598, and in that sense may be regarded as an improvement upon said application, Ser. No. 417,598; however certain features of the present invention are not necessarily limited to use with the particular gyroscope illustrated in said Ser. No. 417,598, and in that respect the present application discloses an independent invention.

It is an object of this invention to provide means and method for caging a gyroscope from any position of the inner gimbal and/or the outer gimbal, and latching the inner gimbal to the outer gimbal and the outer gimbal to the frame, said caging being effected with the gyroscopic element or spin motor in dormant or near dormant position, whereby precessive forces are not involved in the caging operation.

It is another object of this invention to improve upon the gyroscope disclosed in said application Ser. No. 417,-598, by providing a means whereby a gyroscope may be caged by utilization of precessive forces when the spin motor is rotating, and may be alternatively caged by other means not employing precessive forces when the spin motor is dormant or nearly so.

It is a further object of this invention to adapt a precessive type caging mechanism to alternative use when the spin motor is dormant or nearly so, thus precluding the use of precessive forces.

It is a further object of this invention to provide an alternative caging mechanism as above described, in which the precession caging mechanism is uncoupled from the gyroscope gimbals, thereby enabling unencumbered caging of the gimbals by cam action.

It is a still further object of this invention to provide cam action means for caging a gyroscope in the absence of precessive forces otherwise required to cage the gyroscope through precession.

It is a further object to uncouple the torque drive after precessional caging so that any tensions remaining in the system cannot be released during the moment of uncaging to displace the gimbals.

In accordance with these and other objects which will become apparent hereinafter, preferred forms of the present invention will now be described with reference to the accompanying drawing wherein.

Since the present invention is particularly well adapted for incorporation in connection with a gyroscope caging mechanism as shown in said co-pending application Ser. No. 417,598, the drawings herein picture the present invention in such an environment.

For simplicity of explanation, therefore, reference from time to time will be made to the disclosure in said Ser. No. 417,598 for an understanding of certain details which are identical in the present specification and in said Ser. No. 417,598. To this end the same reference numerals as those used in said Ser. No. 417,598 have been used in this specification to denote the same or corresponding parts.

The present invention relates generally to a means whereby the rotation of the spin motor or rotor of the gyroscope is sensed. If the rotor is found to be standing still or to have such a low velocity that precessive forces are not significant, the mechanism of the present invention disables the precessive mechanism disclosed and claimed in said Ser. No. 417,598 and brings into play a mechanism which acts directly on the inner gimbal and the outer gimbal to apply torque individually to the two gimbals to rotate the two gimbals into caged position by cam action. This rotation is rendered quite easy by virtue of the fact that the rotor is dormant or nearly so and therefore no precessive forces need be overcome by the camming action.

The present invention contemplates employing for its cam mechanism the same elements which were used as sensing parts for the precessive mechanism, with slight modification to provide a camming action. In this way the same members serve alternatively as sensing members or probes to control the precessive operation and also as direct camming members in that case where the rotor is dormant, thereby producing the two alternative caging methods without undue complication of operating parts.

As explained in said Ser. No. 417,598 (now Patent No. 2,732,719), a given gimbal is regarded as being "caged" whenever it occupies a predetermined position with respect to the gimbal or other member to which it is pivoted; and the entire gyroscope is regarded as caged when all the gimbals are caged.

Referring to the drawings, Figs. 1 through 15, inclusive, illustrate the first embodiment of the present invention and Figs. 16 through 19 illustrate certain alternative means or methods for sensing the condition of the rotor in order to determine whether precessive or cam action caging is to be effective.

Referring to the drawings, 21 designates a generally cylindrical skeleton like frame including a top plate 22 and a corresponding bottom plate which is not shown. The frame is held together by four bolts 20 which clamp the top plate and the bottom plate together using the cylindrical frame member 21 as a spacer. The gyroscope is mounted to any suitable support (not shown), reference being made to said Ser. No. 417,598 for a typical installation in this regard.

Mounted within the frame 21 for rotation about a vertical axis is an outer gimbal 29. Rotatably mounted within the outer gimbal 29, for rotation about a generally horizontal axis is an inner gimbal 31 shown only schematically in Fig. 18. Rotatably mounted within the inner gimbal 31 for rotation about an axis perpendicular to the inner gimbal axis is a gyroscopic rotor or spin motor 32. For a structural details of these parts, reference is also made to said Serial No. 417,598. Conventional pick-off means are provided in the manner disclosed in said co-pending Serial No. 417,598.

The upper pivot 37 of the outer gimbal 29 extends upwardly through the upper plate 22 and carries a plurality of slip rings 38 which are contacted by brushes 39 by means of which power and signals may be transmitted to and from the inner portion of the gyroscope including the outer gimbal, the inner gimbal and the rotor. Such means are well known in the art and will not be described further in this specification.

Means are provided for sensing the position of the inner gimbal 31 with respect to the outer gimbal 29. Such sensing means includes a disc 41 secured to the inner gimbal 31. Over approximately 90° of its arc, the disc 41 is provided with a segment 42 having a varying radius falling within a given range; over an adjacent 90° segment 43, the disc radius falls within a somewhat larger range. Between the two segments 42 and 43, the disc 41 is provided with a notch 47 having a tapered bottom portion 48. The segment 42 is not formed of constant radius which would form a true arc 42a, but instead is spiraled inward toward the notch 47 to provide a cam surface by means of which radial inward pressure on the surface 42 will cause the disc 41 to rotate clockwise by cam action. Similarly, the disc 43 is not formed on a constant radius, which would produce a true arc 43a but instead is likewise spiraled inward toward the notch 47 to form a cam surface which, when engaged by radial inward force causes the disc 41 to rotate counterclockwise by cam action. The surfaces 42 and 43 thus serve both as sensing surfaces in the manner taught in said Serial No. 417,598 and also as cam action surfaces in accordance with the present invention. It will be noted that the radius of the true arc 42a is less than the minimum radius of the segment 43 at the point where it intersects the notch 47. This is necessary in order to insure that the sensing probe described hereinafter will be able to make an unambiguous reading as to which of the two segments 42 or 43 it has come to rest against.

Figure 4:
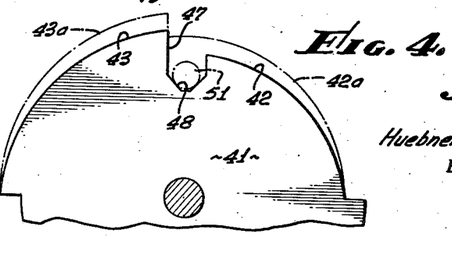
Fig. 4 is a fragmentary view illustrating a portion of the cam secured to the inner gimbal, reference being made to said Ser. No. 417,598 for further understanding of this part.

If desired, the remaining 180° of the disc 41 may be provided with cam surfaces constituting continuation of the surfaces 42 and 43 respectively in order that the inner gimbal may be cammed into position from anywhere within a 360° position. However, inasmuch as in a typical gyroscope the inner gimbal is of necessity limited in its freedom to less than 180° in order to prevent tumbling, it is not necessary to continue the surfaces 42 and 43 beyond the 180° range illustrated in Fig. 4. It is therefore preferable to make the other half of the disc 41 identical with the half shown in Fig. 4 so that part 41 will balance about its center of rotation.

Reciprocably mounted in the outer gimbal 29 in position to register with the disc 41 is a probe 49 which serves as a sensing member, a latching member, and a camming member or plunger, as will be described more particularly hereinafter. At its lower end, the probe 49 is provided with a roller 51 engageable with the periphery of the disc 41. The member reciprocates in a cup-like mounting shell 52 secured through and within the gimbal 29. The details of this shell 52 are set forth in the above mentioned Serial No. 417,598. Suffice to say here that the mounting shell 52 includes a spring which biases the probe 49 upward away from the disc 41 and also forms a key which prevents rotation of the probe 49 while still permitting reciprocation thereof.

The probe 49 is moved up and down in its sensing operation by means of a ring-like actuating or pressure plate assembly 58, which includes a central hub portion 59 closed at the bottom by an annular plate 61. The plate 61 is circular and extends outward beyond the hub 59 into engagement with the probe 49. This engagement is provided by a peripheral groove 62 formed in the edge of the plate 61 in which rides a wheel 63 extending from the upper end of the probe 49 into the groove 62. By virtue of this coupling, the assembly 58 including the plate 61 is free to rotate without rotating the probe 49, while at the same time, any up and down reciprocation of the assembly 58 is transmitted directly to the probe 49.

The top plate or member 22 of the frame 21 has a central portion 64 depending therefrom and around said portion 64 is mounted the hub 59 which is rotatable therearound and also axially movable thereon. The hub 59 is rotated by a belt 67 which rides in a pulley groove 66 formed in the hub. The belt 67 is driven by a drive pulley 68 (Fig. 1) secured to a shaft extending from a gear box 71. Power for the gear box 71 is derived from a small electric drive motor 72. When the motor 72 is energized, the hub 59 will be rotated, thereby rotating the actuating assembly 58. Rotation of the assembly 58 serves to apply a torque to the outer gimbal 29 whenever the assembly 58 is latched to the gimbal as will now be described.

Figures 14, 16, 17, 18, 19:
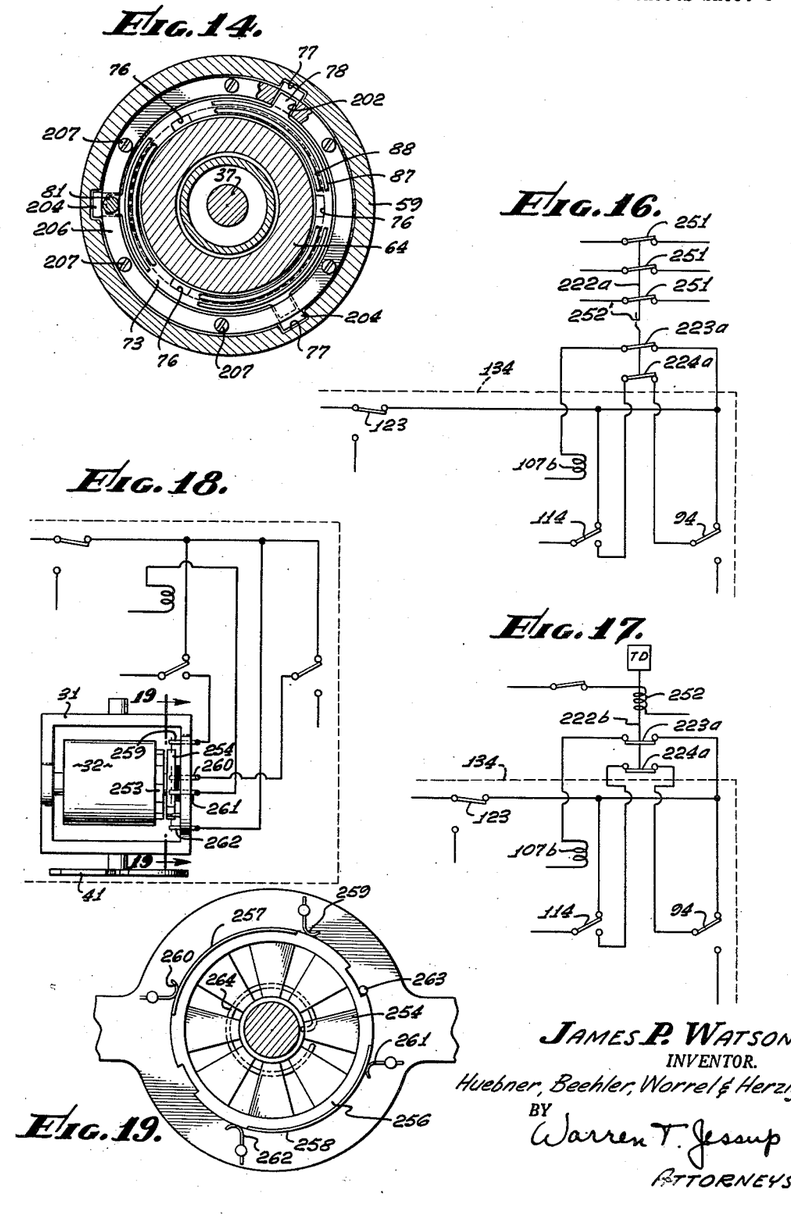
Fig. 14 is a sectional view taken on line 14—14 in Fig. 2.
Figs. 15, 16 and 17 are alternative circuit diagrams illustrating alternative ways of connecting the energizing circuit for the spin motor so as to bring into operation the alternative caging mechanism of the present invention.
Fig. 18 shows a further alternative means bringing into play the alternative caging mechanism of the present invention.
Fig. 19 is a view taken on line 19—19 in Fig. 18.

Latching of the assembly 58 to the gimbal 29 is effected through a drive nut or ring 73 located within an internal cavity 74 formed within and concentric with the hub 59. The driving ring 73 is provided with internal threads 76 (a triple thread being shown by way of example) and is keyed to the hub 59 through the intermediacy of a sleeve 201 disposed circumjacent the ring 73 and interposed between the ring 73 and the hub 59. The sleeve 201 is provided with a plurality of slots as, for example, three slots 202 in which ride the corresponding three tabs 78 extending outward from the ring 73 and serving to key the hub 201 to the ring 73 while still permitting relative reciprocation parallel to the axis 203 of the assembly. The sleeve 201 is likewise keyed to the internal surface of the hub 59 by the provision of three keys 204 which ride in a corresponding number of keyways 77 formed in the hub 59. The keys 204 may be aligned with the keyways 202 if desired as shown in Fig. 14 but such alignment is not necessary.

Figures 2, 3:
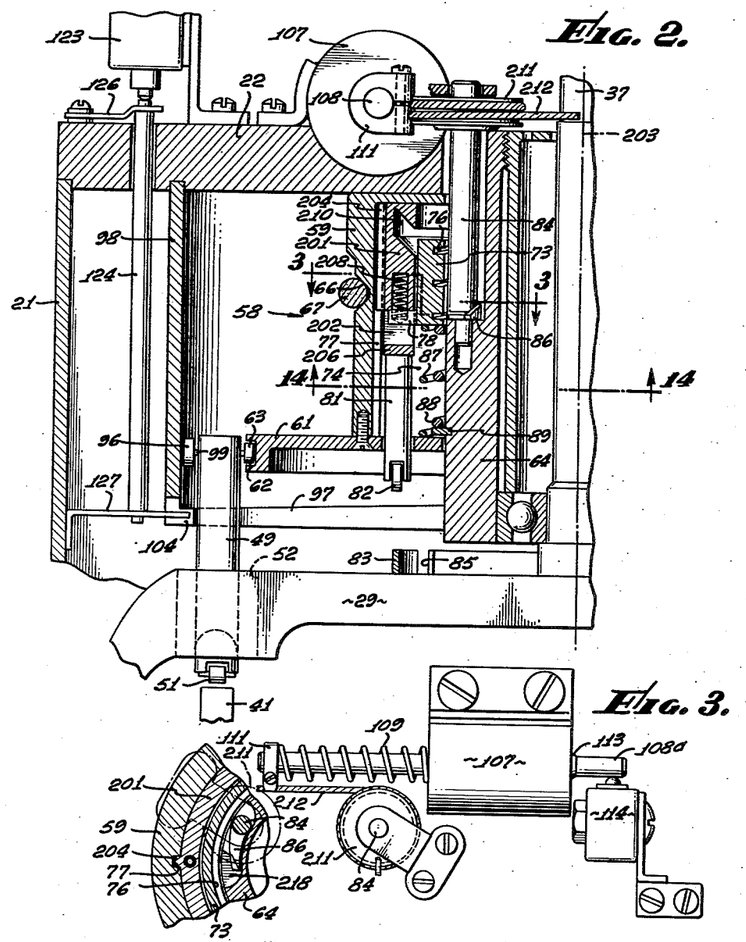
Fig. 2 is a fragmentary sectional elevation taken generally along line 2—2 in Fig. 1.
Fig. 3 is a fragmentary view; the sectioned parts have been taken generally on line 3—3 in Fig. 2; the parts to the right illustrate the corresponding position of certain actuating elements mounted on the top plate of the gyroscope.

A ring 206 is secured to the bottom of the sleeve 201 by means of screws 207 in order to close the bottom ends of the slots 202. The sleeve 201 is biased upward with respect to the nut 73 by the provision of compression springs 208 recessed in the sleeve 201 as shown in Fig. 2 and pressing downward on shallow sockets formed in the upper face of the tabs 78. The inner face of the sleeve 201 is provided with an annular groove 210 which is cut on an upward bias as shown in Fig. 2 for a purpose to be described hereinafter.

Secured to sleeve 201 and passing through ring 206 is a pendant torque pin 81 which extends downwardly through an opening in the bottom plate 61 of the drive assembly 58. To the lower end of the torque pin 81 is rotatably mounted a small roller 82. The roller 82 comes into rolling engagement with a torque ring or rail 83 having a latching notch 85 therein at a certain predetermined point in which the roller 82 may engage in order to latch the actuating assembly 58 to the outer gimbal 29. When thus latched to the gimbal 29, the actuating assembly 58 serves to apply a torque to the gimbal 29.

Figure 1:
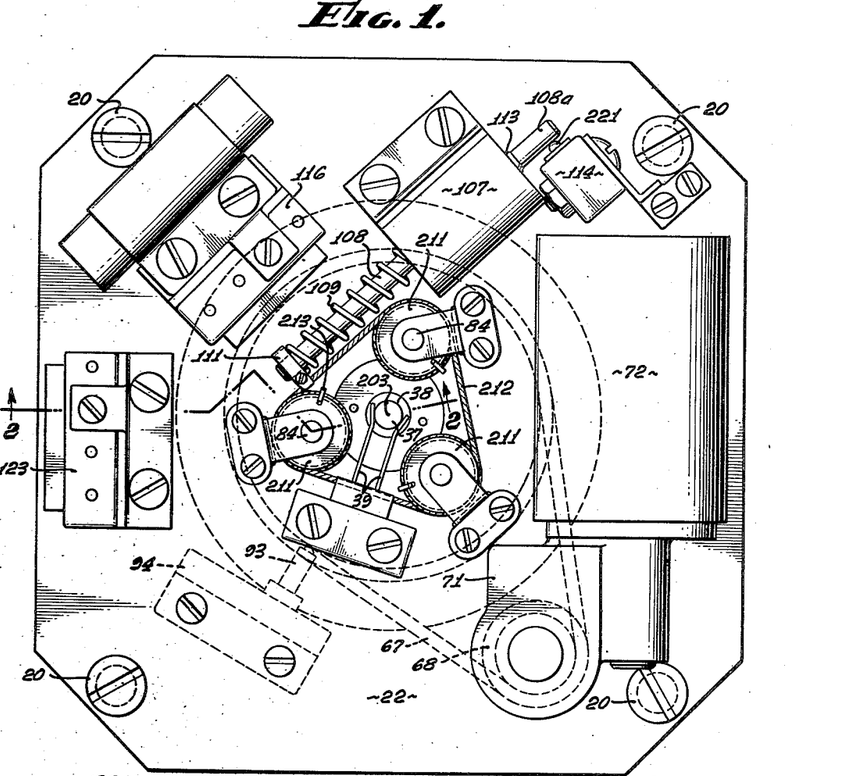
Fig. 1 is a plan view of the caging system for a gyroscope embodying the present invention.

The actuating assembly 58 is moved downwardly with respect to the frame 21 by the provision of a pivoted thread-engaging member or shaft 84 having at its lower end a foot 86 having a toe 214 which may be selectively moved into engagement with the thread 76 by rotation of the member 84. There are preferably several engaging members 84, three being shown by way of example in Fig. 1. Each member 84 has a foot 86 as shown for example in Figs. 12 and 13. The members 84 extend upwardly through the plate 22. At the upper end, each member or shaft 84 is provided with a pulley 211. The shafts 84 are symmetrically distributed around the axis 203 of the assembly as shown in Fig. 1 and cable 212 is wrapped tightly around each pulley as shown in Figs. 1 and 2. Thus, as the cable 212 is pulled back and forth, the three shafts 84 will be caused to rotate in synchronism. Since there is no relative rotation between the cable 212 and the pulleys 211, the cable may be fixedly secured at a given point to each pulley and this is preferably effected by clamping a small disc 213 to the cable 212 and engaging the disc in a corresponding slot in the face of the pulley 211. The cable 212 is actuated back and forth by a solenoid 107 in a manner to be described hereinafter.

Figures 10, 11, 12, 13:
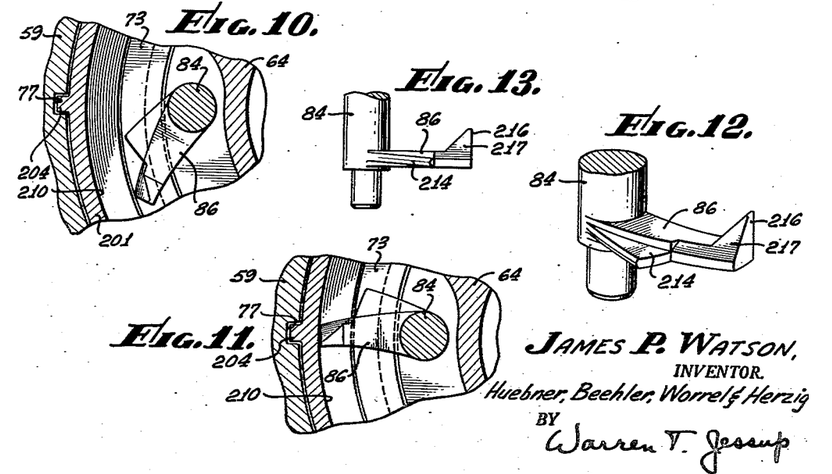
Fig. 10 is a fragmentary section taken on line 10—10 in Fig. 8.
Fig. 11 is a fragmentary section taken on line 11—11 in Fig. 9.
Figs. 12 and 13 are fragmentary perspective and elevation views respectively of one of the operating parts shown in Figs. 8–11.

As best seen in Figs. 12 and 13, the foot portion 86 on each shaft 84 is provided with a special side extension 214 of thickness corresponding to the thread 76 and is formed at an angle, as shown in Fig. 13, corresponding to the helix angle of the thread 76, so that it may smoothly engage in the thread. The end of the foot 86 is provided with a triangular shaped enlargement 216 having a sloping face 217 serving to facilitate engagement of the foot 86 in the groove 210 in a manner to be described hereinafter.

Figure 5:
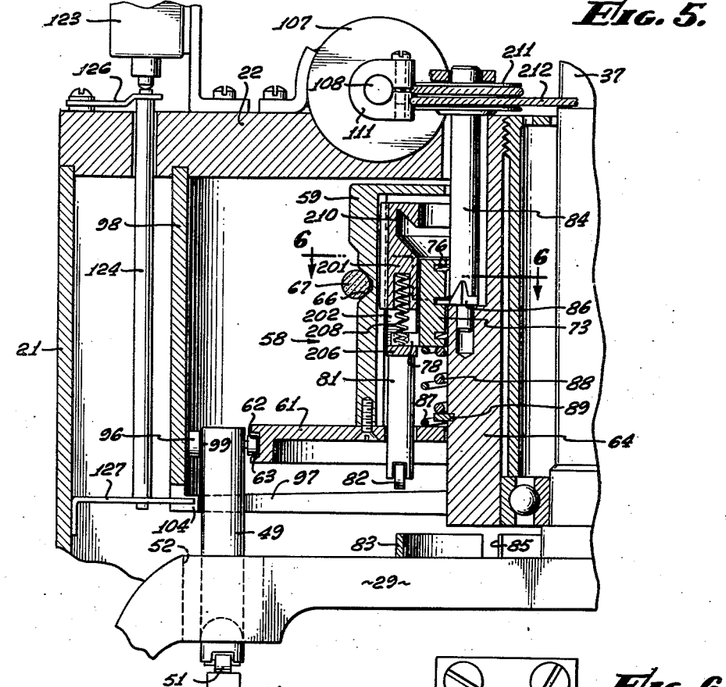
Fig. 5 is a sectional view similar to Fig. 2 illustrating the parts in a different position or attitude of operation.

As long as the shafts 84 are in the position shown in Fig. 2, the feet 86 are in retracted position as shown in Fig. 3 residing in a cavity 218 formed in the cylindrical face of a stationary hub 64. With the assembly 58 rotating, when the cable 212 is moved a sufficient distance to rotate the shaft 84 so as to engage the toe portions 214 in the thread 76, the rotation of the assembly 58 which includes, of course, rotation of the inner ring 73 through the keys 78 and 204, causes downward screwing of the nut or ring 73 within the hub cavity 74, as shown in Fig. 5. The nut 73 thus moves down until the tab 78 engages the ring 206 on the sleeve 201 as shown in Fig. 5, the sleeve 201 having been prevented in the meantime from following the tab 78 by virtue of the springs 208. Further down-screwing of the ring or nut 73 carries sleeve 201 down to the position shown in Fig. 8. At this joint, the foot 86 emerges upon the upper surface of the nut 73.

In this screwing down operation, the nut 73 operates against the upward bias of a compression spring 88 compressed between the lower surface of the nut 73 and an annular ledge 89 formed by a flat snap ring secured to the central boss or stationary hub 64. In the meantime, the downward movement of the nut 73 has been transmitted to the actuating member 58 through an annular compression spring 87 located coaxially in the cavity 74 and bearing at its upper end against the under surface of the nut 73 and at its lower end against the lower plate 61 of the assembly 58.

Continued tension on the cable 212 with resulting torque on the shafts 84 forces the feet 86 further outward against the sloping lower surface of the groove 210 in the sleeve 201. The sleeve 201 is thus forced downward by cam action of the foot 86 on the lower surface of the groove 210 so that by the time the foot 86 and more particularly the enlarged portion 216 has fully entered into the groove 210 the sleeve 201 has been forced downward to the position shown in Fig. 9. This brings the torque pin 81 and more particularly the roller 82 on the lower end thereof into engagement with notch 85 in torque rail or ring 83, on the outer gimbal 29. Should notch 85 be in a position not to receive roller 82, movement of foot 86 would be postponed until roller 82 is brought into register with notch 85.

In the meantime, the assembly 58 and the probe 49 have been forced downward by the compression spring 87 driven by the lowering of the nut 73. The spring 87 is sufficiently strong to overcome the upward bias on the probe 49 in its mounting in the outer gimbal 29. The roller 51 is thus brought into engagement with the periphery of the inner gimbal disc 41 since in a normal gyroscope as explained hereinbefore, the inner gimbal is restrained by stops to a freedom of somewhat less than 180° the roller 51 will engage either the segment 42 or the segment 43 unless by chance it should drop directly into the notch 47, in which case the initial caging of the inner gimbal with respect to the outer gimbal would be accomplished immediately. Unless this direct engagement should occur, which would be only a fortuitous circumstance reflecting the fact that the inner gimbal is already in engaged position, engagement of the roller 51 with the disc 41 brings to a halt the downward motion of the probe 49 and of the assembly 58. Thus the initial up and down or axial position of the hub 59 is determined by the angular position of the inner gimbal 31 which carries the disc 41. This axial position of the hub 59 serves to actuate a driving mechanism in a predetermined desired direction, as will be described hereinafter.

Returning now to the torque pin 81, the roller 82 of which has been described as brought into engagement with the ring 83, with the assembly 58 being continuously rotated by the belt 67, the roller 82 quickly rolls around the rail 83 and drops into the notch 85, thereby latching the outer gimbal 29 to the drive assembly 58.

Figure 15:
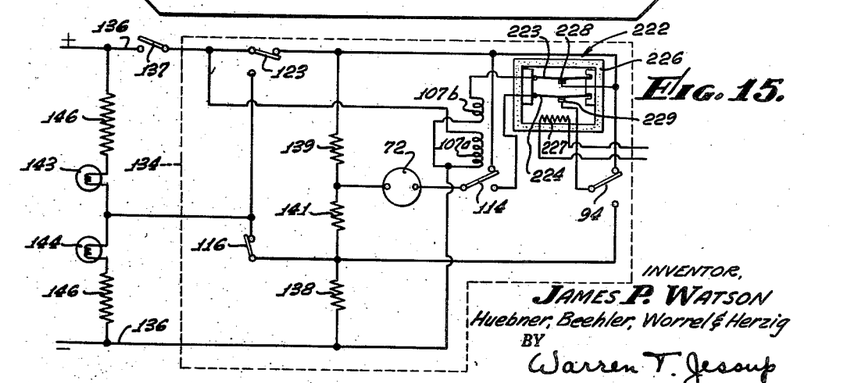

By this time, the probe 49 as described hereinbefore acting on the disc 41 has sensed the attitude or position of the inner gimbal 31. As described in detail in said co-pending application Ser. No. 417,598, this sensing is transmitted to the drive motor 72 through a series of cams on the outer surface of the hub 59 operating probe 93 (Fig. 1) which actuates a reversing microswitch 94 mounted on the underside of the frame plate 22. The switch 94 is single pole double-throw. When the actuating member 58 is in the position determined by the resting of the probe 49 on the disc segment 43, the switch 94 is in the upper position as shown in Fig. 15. If, however, the probe 49 has come into engagement with the segment 42, the switch 94 is then in its lower position. This operation is explained in detail in said Serial No. 417,598.

The mechanism thus described constitutes a means for sensing and translating angular position of the disc 41 into a desired linear position of the reversing switch 94 in order to control precession of the inner gimbal 31 either clockwise or counterclockwise in order thereby to bring the roller 51 into engagement with the notch 47. The circuit for effecting this selective precession of the inner gimbal and the operation thereof is shown in Fig. 15. The inner gimbal is precessed in the desired direction by the application of torque in the proper angular direction to the outer gimbal 29. This torque is applied through the torque pin 81 engaged in the notch 85 and driven by the actuating assembly 58 which is in turn driven by the motor 72 through the belt 67.

The sensing effected by the probe 49 is rendered unambiguous by virtue of the fact that all points on the surface of the cam segment 42 are of lesser radius than any point on the cam surface 43 as described hereinbefore. Thus the switch 94 may be set to respond to two distinct ranges no portions of which are overlapping.

The inner gimbal is thus rotated by precession in the proper direction until the roller 51 is in registry with the notch 47. At this point, it does not drop all the way down to the bottom, but drops to an intermediate position, at which point it is restrained by the engagement of a small wheel 96 extending outwardly from the top of the probe 49, with a track 97 formed by an inturned flange on a depending cylindrical track support 98 mounted to the upper frame plate 22. The track 97 is concentric with the outer gimbal axis 203 and extends all the way therearound. At a predetermined point in its surface, the track 97 is provided with a notch 104 for receiving the roller 96. In accordance with the present invention, both halves of track 97 are pitched from a high point located 180° from notch 104 toward the notch 104, as shown in the developed view Fig. 7. This provides a cam action between roller 96 on probe 49 carried by the outer gimbal 29 and the track 97 which is carried by the frame of the gyroscope. Such cam action is not employed when precessive caging is used, but is employed when non-precessive caging is effected by cam action in accordance with the present invention; this alternative caging is employed when the gyro rotor is quiescent or nearly so.

The wheel or roller 96 is mounted on arbour 99 in a slightly resilient manner, as described in detail in said application Ser. No. 417,598 to which reference is made for a full understanding thereof.

With the probe 49 engaged with the rail 97 through the roller 96 the reversing switch probe 93 has been moved into engagement with a different set of cams on the hub 59 and the torquing of the outer gimbal 29 is continued in whichever direction will require the shorter travel to bring roller 96 into engagement with notch 104. This operation is described in detail in said application Ser. No. 417,598, to which refreence is hereby made.

When the outer gimbal 29 has been rotated in the proper direction by the drive motor 72 as described immediately hereinbefore, the roller 96 rolls around the rail 97 until it is in registry with the V-notch 104 whereupon it drops down into the notch 104 allowing the entire assembly to which it is mounted to drop down a slight distance. This permits the roller 51 to drop fully into engagement with the lower V-surface 48 of the notch 47, thus firmly latching the inner gimbal to the outer gimbal without play or creep. At the same time, the outer gimbal is latched firmly in a similar manner to the frame 21 by engagement of the roller 96 in the V-notch 104.

The caging operation is instituted by energization of a solenoid 107 mounted atop the upper plate 22 and having a plunger 108 extending therefrom. A spring 109 biases the plunger to the position shown in Fig. 1. To the outer end of the plunger 108 is secured a clamp 111 which serves to clamp the cable 212 to the end of the plunger 108. Thus, when the solenoid 107 is energized to pull the plunger 108 to the right in Fig. 1, the cable 212 is pulled to effect rotation of the engaging shafts 84 with the results described hereinbefore.

Figure 6:
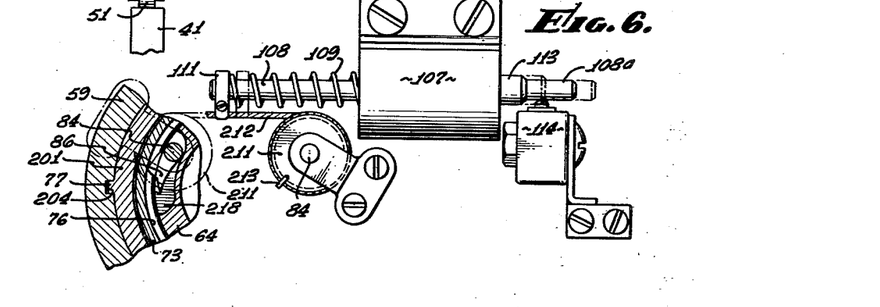
Fig. 6 is a fragmentary view similar to Fig. 3; the sectioned parts have been taken generally on line 6—6 in Fig. 5; the parts to the right illustrate the corresponding position of certain actuating elements mounted on the top plate of the gyroscope.

The other end of the plunger 108 extends from the opposite end of the solenoid 107 as shown at 108a and is engaged by the actuating member 221 of a "transfer" switch 114. The switch 114 is a single pole double-throw switch (Fig. 15) and is so positioned as to be actuated from one position to the other when the plunger 108a moves to the right far enough to bring an enlarged portion 113 into engagement with the actuating button 221, as shown in phantom in Fig. 6. The switch 114 is in the upper position shown in Fig. 15 when the button 221 is in engagement with the smaller portion 108a, and is in the lower position when engaged with the enlarged portion 113. The enlarged portion 113 is so located that it operates the button 221 just as the thread toe 214 emerges on to the upper face of the nut 73, i. e., the position shown in Fig. 8. The transfer switch 114 serves to transfer control of the motor 72 to the reversing switch 94.

As the annular plate 61 of the actuating assembly 58 starts to move down during the caging cycle the "uncaged" switch 116 (Figs. 1 and 15) is actuated. The switch 116 is a single pole, single-throw switch which is in closed position when the plate 61 is in its uppermost (uncaged) position and is in open position at all other times. The structural connection linking the plate 61 with the switch 116 is disclosed in detail in said copending application Ser. No. 417,598. The purpose of the uncaged switch 116 is to indicate through external light 143 that the gyroscope is fully uncaged.

A "caged" switch 123 (Figs. 2 and 15) mounted atop the outer frame plate 22 and actuated by a reciprocable actuating pin 124. The pin 124 is mounted for limited longitudinal reciprocation between a pair of leaf springs 126 and 127 which provide a friction-free longitudinally reciprocable mounting as described in said application Ser. No. 417,598. The spring 127 urges the pin 124 upward toward the switch 123 so as to maintain the switch in the operated position (the upper position in Fig. 15) except when spring 127 is forced and held down by roller 96. The spring 127 extends beyond its junction with the pin 124 and serves as an actuating member to be engaged by the roller or wheel 96 when the wheel 96 drops into the V notch 104 in the track 97.

The caged switch 123 is a single pole, double-throw switch which is maintained in its lower position (Fig. 15) whenever the leaf spring member 127 is engaged by the roller 96 and which is in its upper position at all other times. The principal function of the caged switch 123 is to de-energize motor 72 and solenoid 107b and also to energize light 144 to indicate the gyroscope is fully caged.

While the solenoid 107 has been referred to hereinbefore as if it were a single coil unit, in accordance with the present invention, the solenoid actually contains two coils, 107a and 107b, both of which serve to control the position of the plunger 108. The coils are so positioned with respect to the plunger 108 that energization of the coil 107a alone brings the plunger 108 to rest in a position such that the feet 86 occupy the position shown in Fig. 8. That is to say with the coil 107a alone energized, there is no further stress on the cable 212 to bias or force the toe 216 into the groove 210 in the sleeve 201. When both coil 107a and coil 107b are energized, however, the plunger 108 is drawn further to the right in Fig. 1, so as to force the toes 216 further outward into the groove 210, i. e., into the position shown in Figs. 9 and 11.

In accordance with the present invention, a means is provided for sensing the rotative velocity or rotation of the rotor 32 so as to selectively disable the auxiliary coil 107b and to deenergize the motor 72. The purpose of this sensing is to determine whether the rotor 32 is spinning fast enough to provide the requisite precessive forces for the precession type caging described in Ser. No. 417,598 or whether the rotor is quiescent or so nearly so, that its rotation does not provide significant precessive forces, in which case, direct cam caging must be employed in accordance with the present invention.

A preferred method and mechanism for thus sensing the condition of the rotor is to sense the condition of the energizing force (or electrical circuit in the case of an electrically driven rotor) recognizing that the condition of the rotor will be unambiguously determined within a tolerable range by the condition of the energizing force. Thus, for example, if this sensing means is employed to determine whether the electrical circuit which energizes the spin motor is open or closed, there will be obtained a sufficiently accurate measure of the condition of the spin motor. In order to accommodate the transient condition where the spin motor may be slowing down following the de-energization thereof but still have enough angular kinetic energy to provide caging precession, a time delay switch may be provided which will not function until a predetermined time after the de-energization of the spin motor circuit, which time is equal (within tolerable limits) to the time taken for the spin motor to decelerate to such a speed that its precessive forces are no longer significant.

Such a means and method is shown by way of example at 222 in Fig. 15. The thermal relay 222 comprises thermally responsive elements 223 and 224 contained within a heat insulating casing 226. The interior of the casing 226 is heated and kept heated by a small heating element 227 energized in conjunction with the energization of the spin motor 32 of the gyroscope. Thermal elements such as are illustrated schematically at 223 and 224 are well known in the art. When the heating source is turned off by the de-energization of the spin motor and of the heating element 227 the interior of the casing 226 gradually cools. When the temperature has dropped to a predetermined value, the thermal elements 223 and 224 snap upward, opening contacts 228 and 229. As shown in Fig. 15, the contacts 228 are in series between the auxiliary coil 107b and the positive supply. The contacts 229 are in series in the conductor connecting the transfer switch 114 and the reversing switch 94. Thus a predetermined time after de-energization of the spin motor, as determined by the cooling of the relay 222, the contacts 228 and 229 will open with a result to be described hereinafter.

Except for the operation and effect of the time delay relay 222 and solenoid coil 107b, the circuit shown in Fig. 15 is the same as that shown in Fig. 14 of said application Ser. No. 417,598 and the operation of the circuit is otherwise the same as the operation described in said application.

*Operation*

Operation of the present invention may be best described by considering two alternatives: the first with the spin motor energized, in which case precessive caging is effected; and the second with the spin motor dormant or nearly so, in which case cam action caging is effected.

The first type of caging is substantially the same as described in said application, Ser. No. 417,598, with the major exception that the entire torque drive is disconnected from the outer gimbal when caging is completed as will be described hereinafter. However, the first type of caging will be reviewed briefly here in order to better understand the alternative form to be described hereinafter.

When the switch 137 stands open, the gyroscope is uncaged and the green light 143 is lit to indicate this condition. Caging is instituted by closing the switch 137 and leaving it closed. It having been assumed here that the spin motor 32 is in energized condition, the heater 227 is likewise energized with the resulting heat keeping the contacts 228 and 229 closed. Closing of the switch 137 applies voltage simultaneously to the solenoid coils 107a and 107b in parallel and also to the motor 72 through the transfer switch 114 and the resistors 141 and 138. Energizing of the motor 72, causes the central hub portion 59 to be rotated in a given direction, called the forward direction, by the belt 67. At the same time, the solenoid 107 pulls the cable 212 clockwise in Fig. 1, thereby rotating each of the shafts 84 clockwise. Such rotation causes the thread engaging portion 214 of each of the feet 86 to enter into the threads 76 in the nut 73. That is, the toe 214 moves from the position shown in Fig. 2 to a position similar to that shown in Fig. 5.

Rotation of the hub 59 is now imparted to the ring or nut 73 through the intermediacy of the sleeve 201 thus causing the nut 73 to be screwed downward as shown in Fig. 5. As the ring 73 moves downward within the cavity 74, it presses the actuating assembly 59 down ahead of it through the intermediacy of the spring 87. Initial downward movement of the plate 61 opens the uncaged switch 116, in the manner described in said Ser. No. 417,598, opening of switch 116 (Fig. 15) places both of the lights 143 and 144 in series across the power supply. This causes the green light to cease to glow brightly and instead, both the green and red lights glow dully, indicating that the parts are operating and that the gyroscope is neither fully caged nor fully uncaged.

Figure 8:
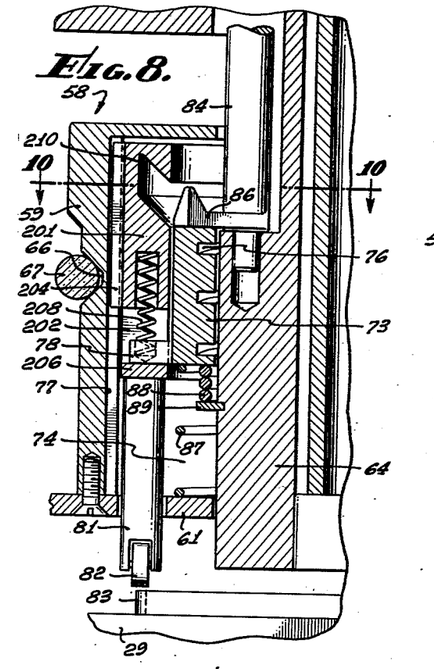
Figs. 8 and 9 are enlarged fragmentary views generally similar to Fig. 5 and illustrating the parts in different positions of operation.
Figure 9:
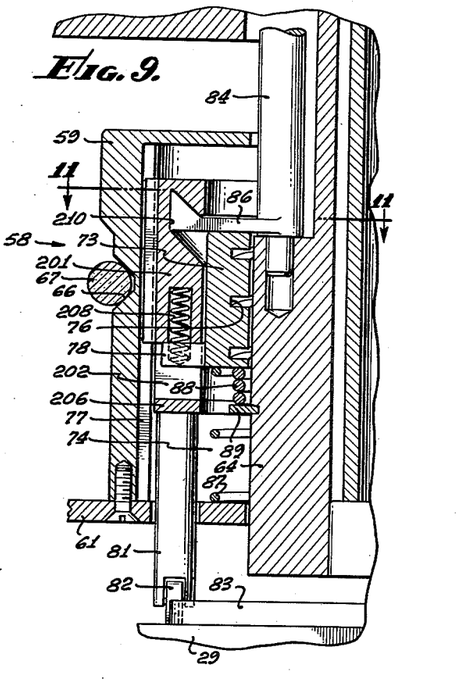

The ring or nut 73 continues to move downward until the foot 86 emerges on to the top of the nut 73 and moves further outward as shown in Fig. 8. Approximately simultaneously with this operation the plunger 108 moves into such position that the enlarged portion 113 is brought into engagement with the transfer switch 114, thereby operating the switch from upper to lower position (Fig. 15) and transferring control of the motor 72 to the reversing switch 94. It having been assumed that the spin motor is energized so that the relay 222 is in closed position, the coil 107b is also energized, thus continuing the torque on the three shafts 84 and continuing to press the three toes 216 still further outward into the beveled groove 210 in the sleeve 201. This pressure of the toes 216 causes them to move into the groove 210 as shown in Fig. 9, pressing the sleeve 201 downward against the bias of the springs 208. This brings the parts into the positions shown in Figs. 9 and 11 and causes the roller 82 to be brought into engagement with the torque ring or track 83 on the outer gimbal 29. Since the assembly 58 is being constantly rotated, the roller quickly runs around the track 83 until it drops into the groove 85 thereby latching the rotating assembly 58 to the outer gimbal 29 and applying a torque thereto.

The position of the reversing switch 94 at this particular moment depends on what has happened in the meantime to the sensing probe 49 as it was moved down into engagement with the disc 41. If the roller 51 has gone into engagement with the high segment 43 on the disc 41, then the downward movement of the actuating member or assembly 58 will have been halted at such a position that the switch operating probe 93 is in engagement with a certain cam surface on the hub 59. In this event, the motor 72 continues to rotate in the same, or forward direction, since the reversing switch 94 has not been operated. In this manner, the torque applied to the outer gimbal 29 is caused to be in such a direction as to precess the inner gimbal 31 so as to rotate the disc 41 in such a direction as to bring the probe 49 into registry with the notch 47.

In the event that the probe 49 has come into engagement with the smaller radiused segment 42, then the assembly 58 will have dropped down far enough to bring the probe 93 into engagement with another cam portion on the hub 59. This will have operated the reversing switch 94 so that the torque applied to the outer gimbal 29 is in the opposite direction so as to again precess the inner gimbal 31 in such a direction as to rotate the disc 41 to bring the probe 49 into registry with the notch 47. This operation is the same as described in connection with said Ser. No. 417,598 and reference is made thereto for a fuller understanding thereof.

When the roller 51 registers with the notch 47, the probe 49 moves downward under the compression force of the spring 87. This movement is stopped by engagement of the upper roller 96 carried by the probe 49, with the track 97. At this point, the inner gimbal will be latched to said outer gimbal as explained in Ser. No. 417,598. Whereas the outer gimbal 29 was virtually immovable as long as the inner gimbal was allowed to precess, once the inner gimbal is latched to the outer gimbal, the outer gimbal may be readily rotated by the torque applied through the torque pin 81.

The direction of torque now applied to the outer gimbal 29 by the motor 72 is dependent upon the position of the reversing switch 94 the probe 93 of which has now moved into engagement with another cam surface on the hub 59 as explained in said Ser. No. 417,598. This cam surface positions the switch 94 so as to drive the motor 72 in such a manner that minimum length of travel of the outer gimbal 29 is required to bring the roller 96 into registry with the notch 104 in the track 97. When this occurs, both rollers 96 and 51 will firmly seat in their respective notches, thus caging the outer gimbal 29 to the frame 21 and further tightening the caging of the inner gimbal with respect to the outer gimbal as explained in said Ser. No. 417,598.

As roller 96 drops into notch 104, it moves the leaf spring 127 down, thereby operating the caged switch 123 through the intermediacy of the pin 24. This moves the caged switch 123 into its lower position in Fig. 15, de-energizing the motor 72 and the solenoid coil 107b. The solenoid plunger 108 now returns feet 86 to the position shown in Fig. 8. This movement allows springs 208 to lift sleeve 201, thereby retracting roller 82 from notch 85. This disconnects the torque drive from gimbal 29 thereby precluding the possibility that any tension remaining in the torque drive, for example the belt 67, after caging could cause displacement of the gimbals while uncaging. The shape of groove 210 and toe 216 is such that withdrawal cannot occur without sleeve 201 being raised. Operation of switch 123 also shunts the green signal light 143. This causes the red light 144 to glow brightly, indicating that the gyroscope is in fully caged position.

Energization of the solenoid coil 107a continues to keep the actuating assembly 58 pressed downward into caged position by virtue of the continued engagement of the foot 86 with the top of nut 73.

Uncaging is effected simply by opening the switch 137. This de-energizes the solenoid coil 107a, allowing the spring 109 to move the plunger 108 to the left in Fig. 1, thereby moving the cable 212 in a counterclockwise direction. This rotates each of the three shafts 84, causing the feet 86 to be retracted from the position shown in Fig. 8 to the position shown in Fig. 2. This releases nut 73, which is moved rapidly upward by spring 88. Projections 78 engage sleeve 201 and force it upward at the same time. Sleeve 201 carries hub 59 along with it. Plate 61 being fastened to hub 59 is carried upward, thus releasing probe 49 which is urged upward by its own spring and assisted, if necessary, by engagement of roller 63 in groove 62. The parts come to rest in the positions shown in Fig. 2. It should be noted that probe 49 is halted by its own stop in gimbal 29 and comes to rest so as to leave clearance around all sides of roller 63 so that no contact exists between roller 63 and groove 62. Reference should be made to aforementioned Ser. No. 417,598 for a more detailed description of these parts. The withdrawal of roller 96 from notch 104 releases the outer gimbal from the frame and the withdrawal of roller 51 from notch 47 releases the inner gimbal from the outer gimbal.

In the releasing operation, the caged switch 123 is moved to its upper position in Fig. 15 and immediately thereafter, the uncaged switch 116 is closed. Thus, the lamp 144 glows dimly in series with the lamp 143 for a fraction of a second during the uncaging operation and then the lamp 144 goes out and the lamp 143 attains full brilliance, indicating that the gyroscope is in uncaged position.

Except for the intermediacy of the sleeve 201, the caging and uncaging operation described above, are virtually the same as those operations in said Ser. No. 417,598, and embody the same advantages as are embodied in the earlier apparatus of said Ser. No. 417,598. In addition there is the added advantage of the elimination of disturbance during uncaging due to any possible windup or tensioning in the drive belt 67, explained hereinbefore.

In accordance with the present invention, the apparatus disclosed herein is also capable of caging and uncaging even though the spin motor or gyroscopic element may be stationary or may be operating at such low speed as to render precessive effects insignificant.

Let it be assumed that the energy to the spin motor has been cut off. Whether this energy has been provided in the form of an electric current or whether it is provided in the form of air pressure through pneumatic drive, suitable means are provided for de-energizing the heater 227 (Fig. 15) simultaneously with the cutting off of the power supply to the spin motor or other gyroscopic elements, denoted 32. Spin motors not only have a large momentum but are also mounted on very low friction bearings so that as a rule they will continue to spin for many minutes after de-energization. In the particular embodiment shown in Fig. 15, the thermal relay assembly 222 is so insulated by the casing 226 that the heat retained within the casing 226 will be dissipated at the proper rate to open the individual contacts 228 and 229 at the same time that the spin motor has slowed down to the point where precessive forces are no longer significant either for effecting the caging operation or for interfering in any way with the cam type of caging operation. Even after the spin motor has been de-energized, if sufficient time has not elapsed to cool the relay 222 to the open position, the closing of the caging switch 137 will still effect precessive caging in the manner described hereinbefore. If, however, sufficient time has elapsed to allow the contacts 228 and 229 to open corresponding to a low speed or dormant condition of the spin motor, then a different type of caging will be effected through the mechanism disclosed herein.

The same criteria will govern in the acceleration of the spin motor, that is to say the spin motor will take some time to come up to speed and during this time non-precessive caging will apply up until the point that the contacts 228 and 229 close, this closing representing the point at which the spin motor has attained sufficient speed to bring precessive forces into significance.

Let it be assumed that the contacts 228 and 229 are open, representing either a quiescent spin motor or one of insignificantly low speed. Closing of the caging switch effects operation of the caging parts in the same manner as described hereinbefore, up to the point where the toe 86 has moved over the top surface of the nut 73 as shown in Fig. 8. As explained hereinbefore, the only force tending to move the toe 86 further outward is the coil 107b which now is kept de-energized by the open contacts 228. Thus this part of the assembly 58 will remain in the position shown in Fig. 8, and the torque pin 81 will not come into engagement with the ring 83 on the outer gimbal 29.

However, the probe 49 being controlled by the axial position of the assembly 58 which in turn is dependent upon the position of the inner nut 73, will operate as before. That is, it will be placed into engagement with either the segment 42 or 43 of the disc 41. The pressure applied by the probe 49 to the disc 41 will, by virtue of the slight cam surface on the disc shown in Fig. 4 apply a torque through the cam action to the disc 41 such as to rotate it one way or the other to bring the notch 47 into engagement with the probe 49. While this torque will be relatively low, there will be only insignificant resistance to rotation of the inner gimbal because of the quiescence of the spin motor.

Figure 7:
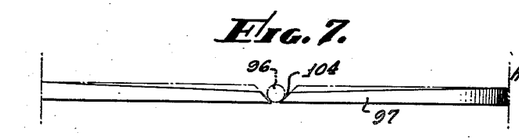
Fig. 7 is a developed view of a cam surface employed in the caging operation.

As soon as the probe 49 drops into the notch 47, the roller 96 comes into engagement with the rail 97 on the frame of the gyroscope. By virtue of the cam surface of the rail 97 directed toward the notch 104, as shown in Fig. 7, the pressure of the roller 96 on the rail 97, applies a small torque to the outer gimbal 29 which by now has been latched to the inner gimbal 31. This torque rotates the outer gimbal 29 until the roller 96 registers with the notch 104 and drops thereinto. It will thus be seen that whether precessive or cam type caging is employed, the latching mechanism and steps are substantially identical with those employed for precessive caging and the various control switches shown in Fig. 15 will react in the same manner to control the circuit, with this qualification.

The moment the foot 86 moves into position atop the nut 73 as shown in Fig. 8, the switch 114 is moved to its lower position in Fig. 15, as described hereinbefore. Now, however, instead of transferring control of the motor 72 to the reversing switch 94, the motor 72 is completely de-energized because of the fact that the contacts 229 in series between the switches 114 and 94 are now open. Thus, the motor 72 is completely de-energized and the hub 59 is no longer rotating during the two cam caging operations described immediately above. It will be noted, however, that the control lights 143 and 144 continue to accurately indicate the caging condition of the gyroscope, in the same manner as during precessive caging.

Other means for selecting between precessive and non-precessive caging may be employed if desired. For example, there is shown in Fig. 16 an alternatively circuit wherein the switch elements 223a and 224a are placed outside of the gyroscope proper and are connected thereto. The switches 223a and 224a electrically take the place of the contacts 228 and 229 in Fig. 15 and are operated by being ganged to a switch assembly 222a the opening of which opens a plurality of individual switch contacts 251, through which the spin motor is energized. Allowance can be made for the transient period during which the spin motor is accelerating or decelerating by disconnecting the linkage between the switch, as shown schematically at 252, so that 223a and 224a can be operated independently of 222a.

In Fig. 17, the external contacts 223a and 224a are shown ganged to a time delay relay 222b controlled by a relay coil 252. The coil 252 is controlled in accordance with the energization of the spin motor in generally the same manner as the heating element 227 of Fig. 15. Thus, when the spin motor is de-energized, the coil 252 is also de-energized. The relay 222b however, does not open immediately because of its time delay feature; the time delay is adjusted to coincide with the deceleration period of the spin motor in the same manner that the time delay of the thermal switch assembly 222 is adjusted.

If desired, an even more direct measure of the spin motor speed may be employed to control the circuit for selection of precessive or non-precessive caging. Such a means is shown in Figs. 18 and 19 wherein the spin motor or motor 32 is provided with a plurality of vanes or fan blades 253 and closely adjacent thereto is a receiving fan 254 having a ring 256 secure around the periphery thereof. Carried by the ring 256 are a pair of arcuate commutator segments 257 and 258. The segment 257 is contacted continuously by a brush 260 and is engaged selectively by another brush 259 depending upon the position of the fan 254. The segment or arc 258 is similarly engaged by brushes 261 and 262. The brushes 259–260 correspond to the contacts 229 of Fig. 15 and the brushes 261–262 correspond to the contacts 228 of Fig. 15. Rotation of the fan 254 is limited to a small arc by means of a stationary pin 263 operating in an arcuate slot formed in the ring 256.

The fan 254 is biased in a counterclockwise direction in Fig. 19 by a torsion spring 264.

As the rotor 32 comes up to speed, the fan blades 253 thereof will apply an increasing torque to the fan 254 gradually turning it clockwise against the bias of the spring 264, when a predetermined rotor speed is attained, the brush 259 engages the segment 257 and the brush 262 engages the segment 258. This predetermined speed corresponds to the speed at which precessive forces of the spin motor have become great enough to effect satisfactory precessive caging in accordance with the first mode of operation described herein. As will be readily seen in Fig. 18, the closing of the switch elements, corresponding to closing of the contacts 228 and 229 makes the gyroscope control circuit receptive for operation of precessive caging. As the rotor 32 shown in Fig. 18 slows down following de-energization, to the point where precessive forces are no longer significant, the two switches open and the circuit is thereby readied for non-precessive or cam type caging.

It will be seen that the present invention fully and completely accommodates precessive forces. If the spin motor is rotating precessive forces are actually employed to effect the caging of the gyroscope; if the spin motor is not rotating, other forces are supplied in order to effect the caging. In no case is it necessary to overcome or fight against precessive forces, in the one case, such forces being employed and in the other case such forces being absent. It will be further noted that the cam type or non-precessive caging of the present invention is effective without requiring rotation of anything but the gimbals themselves plus the slight added weight of the probe 49. That is to say, when cam type caging is employed, the mechanism embodied in the actuating assembly 58 need not be moved in any way since it is not coupled to the outer gimbal during non-precessive caging. Such coupling or latching is precluded by the provision of the sleeve 201 which carries the torque pin 81 and which is held out of engagement from the outer gimbal 29 because of the halting of the toe members 86 as described hereinbefore.

Thus the sleeve 201 introduces two marked advantages over the structure illustrated as disclosed in said application Ser. No. 417,598. First, it permits of cam type caging without the necessity of dragging along the mechanism of the drive assembly 58; and second, it prevents any torque disturbance upon uncaging, which might result from windup or stored tension in the belt 67. Except for this added advantage, the precessive caging operation of the present invention is the same as that described in said Ser. No. 417,598, as has been described hereinbefore in connection with the precessive type caging.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

I claim:

1. Means for caging a gyroscope having a frame, an outer gimbal pivotally mounted to said frame, an inner gimbal pivotally mounted to said outer gimbal, and a rotor pivotally mounted to said inner gimbal, comprising: means for applying torque to one of said gimbals, thereby to precess the other of said gimbals into caged position, means for latching said gimbals together, means for continuing application of torque to rotate said one gimbal into caged position, means for latching said one gimbal in caged position, and means responsive to rotor rotation for applying torque to said other gimbal, thereby to rotate said other gimbal into caged position.

2. Means for caging a gyroscope having a frame, an outer gimbal pivotally mounted to said frame, an inner gimbal pivotally mounted to said outer gimbal, and a rotor pivotally mounted to said inner gimbal comprising: means for applying torque to one of said gimbals, thereby to precess the other of said gimbals into caged position, means for latching said gimbals together, means for continuing application of torque to rotate said one gimbal into caged position, means for latching said one gimbal in caged position, means responsive to rotor rotation for applying torque to said other gimbal, thereby to rotate said other gimbal into caged position, and means responsive to rotor rotation for applying torque to said one gimbal, thereby to rotate said one gimbal into caged position.

3. Means for caging a gyroscope having a frame, an outer gimbal pivotally mounted to said frame, an inner gimbal pivotally mounted to said outer gimbal, and a rotor pivotally mounted to said inner gimbal, comprising: means for applying torque to said outer gimbal thereby to precess said inner gimbal into caged position, means for latching said gimbals together, means for continuing application of torque to rotate said outer gimbal into caged position, and means responsive to rotor rotation for applying torque to said inner gimbal in the absence of rotor rotation above a predetermined speed, thereby to rotate said inner gimbal into caged position.

4. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying torque to one of said gimbals, thereby to precess the other of said gimbals into caged position, means for latching said gimbals together, means for continuing application of torque to rotate said one gimbal into caged position, means for latching said one gimbal in caged position, and means responsive to rotation of said rotor for disabling said torque applying means and for applying torque to said other gimbal, thereby to rotate said other gimbal into caged position.

5. Apparatus according to claim 4, wherein said disabling means comprises time delay means responsive to energization of said rotor for disabling said torque applying means and for applying torque to said other gimbal a predetermined time after de-energization of said rotor.

6. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying torque to one of said gimbals, thereby to precess the other of said gimbals into caged position, means for latching said gimbals together, means for continuing application of torque to rotate said one gimbal into caged position, means for latching said one gimbal in caged position, and means responsive to rotation of said rotor for disabling said torque applying means in the absence of rotor rotation above a predetermined speed and for applying torque to said other gimbal, thereby to rotate said other gimbal into caged position, and for applying torque to said one gimbal, thereby to rotate said one gimbal into caged position.

7. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying torque to said outer gimbal, thereby to precess said inner gimbal into caged position; means for latching said gimbals together; means for continuing application of torque to rotate said outer gimbal into caged position; means for latching said outer gimbal in caged position; and means responsive to rotation of said rotor for disabling said torque applying means in the absence of rotor rotation above a predetermined speed and for applying a torque to said inner gimbal, thereby to rotate said inner gimbal into caged position.

8. Means for caging a gyroscope having a frame, an outer gimbal pivotally mounted to said frame, an inner gimbal pivotally mounted to said outer gimbal, and a rotor pivotally mounted to said inner gimbal, comprising: means for sensing the speed of said rotor; means responsive to rotor speed above a predetermined value for applying torque to said outer gimbal thereby to precess said inner gimbal into caged position; means responsive to rotor speed below said predetermined value for applying a torque to said inner gimbal independent of precession thereby to rotate said inner gimbal into caged position; and means for rotating said outer gimbal into caged position with respect to said frame.

9. Apparatus for caging a gyroscope having a frame, an outer gimbal pivotally mounted to said frame, an inner gimbal pivotally mounted to said outer gimbal, and a rotor pivotally mounted to said inner gimbal, comprising: cam means for rotating said inner gimbal into caged position with respect to said outer gimbal from any position of said inner gimbal within said outer gimbal, means for latching said inner gimbal to said outer gimbal while leaving said outer gimbal free to rotate, cam means for rotating said outer gimbal into caged position, with respect to said frame from any position of said outer gimbal within said frame, and means for latching said outer gimbal to said frame in caged position of said outer gimbal.

10. Apparatus for caging a gyroscope having a frame, an outer gimbal pivotally mounted to said frame, an inner gimbal pivotally mounted to said outer gimbal, and a rotor pivotally mounted to said inner gimbal, comprising: means for rotating said inner gimbal to caged position with respect to said outer gimbal, said inner gimbal rotating means comprising a pair of members, one of which is mounted on said inner gimbal, the other of which is mounted on said outer gimbal, one of said members being a cam having a notch therein, the other of said members being an engaging member, said inner gimbal rotating means including means for effecting engagement between said members to cause said inner gimbal to be rotated into caged position by cam action, and to effect engagement of said engaging member in said cam notch to latch said inner gimbal in caged position to said outer gimbal, leaving said outer gimbal free to rotate, means for rotating said outer gimbal into caged position in said frame, said outer gimbal rotating means including a member mounted to said frame and a member mounted to said outer gimbal, one of said members being an engaging member, the other said member being a cam, said cam having a notch therein for receiving said engaging member, said outer gimbal rotating means including means for effecting engagement between said engaging member and said cam to rotate said outer gimbal by cam action until said engaging member enters said cam notch, said cam notch serving to latch said outer gimbal in caged position with respect to said frame.

11. Method of caging a gyroscope including a frame, an outer gimbal pivoted to said frame, an inner gimbal pivoted to said outer gimbal, and a rotor pivoted to said inner gimbal, comprising: sensing the speed of rotation of said rotor; responding to rotor speed above a predetermined value by precessing said inner gimbal through application of torque to said outer gimbal, until said inner gimbal has arrived at caged position; alternatively responding to rotor speed below a predetermined value by physically applying a torque to said inner gimbal independent of precession through said outer gimbal, until said inner gimbal has arrived at caged position; latching said inner gimbal to said outer gimbal in caged position; rotating said outer gimbal in said frame until said outer gimbal has reached caged position; and latching said outer gimbal to said frame in caged position.

12. Method of caging a gyroscope including a frame, an outer gimbal pivoted to said frame, an inner gimbal pivoted to said outer gimbal, and a rotor pivoted to said inner gimbal, comprising: sensing the rotative speed of said rotor; precessing said inner gimbal if rotor speed is above a predetermined value, by applying a torque to said outer gimbal until said inner gimbal has been rotated into caged position; alternatively applying a torque to said inner gimbal independent of precession through said outer gimbal, if rotor speed is below said predetermined value, to rotate said inner gimbal into said caged position; and rotating said outer gimbal in said frame into caged position of said outer gimbal.

13. Apparatus for caging a gyroscope having a frame, an outer gimbal pivoted to said frame, an inner gimbal pivoted to said outer gimbal, and a rotor pivoted to said inner gimbal, comprising: rotative drive means; drive-latch means for latching said drive means to said outer gimbal, thereby to effect application of torque to said outer gimbal by said drive means and to thus precess said inner gimbal into caged position; inner gimbal latching means for latching said inner gimbal with respect to said outer gimbal in the caged position of said inner gimbal; outer gimbal latching means for latching said outer gimbal to said frame in caged position of said outer gimbal; means responsive to rotation of said rotor for disabling said drive-latch means, thereby to preclude latching of said drive means to said outer gimbal whenever said rotor is below a predetermined speed; inner gimbal rotating means for effecting rotation of said inner gimbal when said rotor speed is below said predetermined speed, said means comprising a pair of members, one of which is mounted to said inner gimbal, one of said members being a cam, the other being an engaging member for engaging said cam, said inner gimbal rotating means including means for effecting engagement between said members, thereby to force said inner gimbal into caged position by cam action, said inner gimbal latching means comprising a notch in said cam for receiving said engaging member, thereby to latch said inner gimbal with respect to said outer gimbal; outer gimbal rotating means for effecting direct rotation of said outer gimbal when said rotor speed is below said predetermined speed, said means comprising a pair of members one of which is mounted to said outer gimbal, one of said members being a cam, the other being an engaging member for engaging said cam, said outer gimbal rotating means including means for effecting engagement between said members, thereby to force said outer gimbal into caged position by cam action, said outer gimbal latching means comprising a notch in said last mentioned cam for receiving said engaging member, thereby to latch said outer gimbal to said frame in caged position of said outer gimbal.

14. Means for caging a gyroscope having a frame, an outer gimbal pivotally mounted to said frame, an inner gimbal pivotally mounted to said outer gimbal, and a rotor pivotally mounted to said inner gimbal, comprising: means for applying torque to one of said gimbals, thereby to precess the other of said gimbals into caged position; means for latching said gimbals together; means for continuing application of torque to rotate said one gimbal into caged position; means for latching said one gimbal in caged position; and means responsive to rotor rotation for applying torque, in the absence of rotor rotation above a predetermined speed, to said other gimbal, thereby to rotate said other gimbal into caged position from any position of said other gimbal with respect to said one gimbal.

15. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying torque to said outer gimbal, thereby to precess said inner gimbal into caged position; means for latching said gimbals together; means for continuing application of torque to rotate said outer gimbal into caged position; means for latching said outer gimbal in caged position; and cam means responsive to rotation of said rotor for disabling said torque applying means, in the absence of rotor rotation above a predetermined speed, and for applying torque to said inner gimbal at any position of said inner gimbal within said outer gimbal, thereby to rotate said inner gimbal into caged position.

16. Means for caging a gyroscope having a frame, an outer gimbal pivotally mounted to said frame, an inner gimbal pivotally mounted to said outer gimbal, and a rotor pivotally mounted to said inner gimbal, comprising: means for sensing the speed of rotation of said rotor; means responsive to rotor speed above a predetermined value for applying torque to said outer gimbal, thereby to precess said inner gimbal into caged position within said outer gimbal; and means responsive to rotor speed below said predetermined value for applying torque to said inner gimbal independent of precession, thereby to rotate said inner gimbal into caged position within said outer gimbal.

17. Means for caging a gyroscope having a frame, an outer gimbal pivotally mounted to said frame, an inner gimbal pivotally mounted to said outer gimbal, and a rotor pivotally mounted to said inner gimbal, comprising: torque applying means for applying torque to said outer gimbal, thereby to precess said inner gimbal into caged position; means for continuing application of torque to rotate said outer gimbal into caged position; and means for coupling said torque applying means to said outer gimbal until both of said gimbals have been rotated to caged position, and for thereafter uncoupling said torque applying means from said outer gimbal, leaving said gimbals in caged position.

18. Means for caging a gyroscope having a frame, an outer gimbal pivotally mounted to said frame, an inner gimbal pivotally mounted to said outer gimbal, and a rotor pivotally mounted to said inner gimbal, comprising: means for applying torque to said outer gimbal, thereby to precess said inner gimbal into caged position; means for latching said gimbals together; means for continuing application of torque to rotate said outer gimbal into caged position; means for latching said outer gimbal into caged position; and means for coupling said torque applying means to said outer gimbal until said gimbals have been rotated into caged position, and for thereafter uncoupling said torque applying means from said outer gimbal, leaving both of said gimbals latched in caged position.

19. Method of caging a gyroscope, including a frame, an outer gimbal pivoted to said frame, an inner gimbal pivoted to said outer gimbal, and a rotor pivoted to said inner gimbal, comprising the steps of: coupling a torque appling means to said outer gimbal, thereby to precess said inner gimbal into caged position; latching said inner gimbal to said outer gimbal in caged position; rotating said outer gimbal into caged position; latching said outer gimbal to said frame in caged position; and uncoupling said torque applying means from said outer gimbal, leaving both of said gimbal latched in caged position.

20. Apparatus for caging a gyroscope having a frame, an outer gimbal pivotally mounted to said frame, an inner gimbal pivotally mounted to said outer gimbal, and a rotor pivotally mounted to said inner gimbal, comprising: torque applying means for applying a torque to rotate one of said gimbals into caged position; means for latching said gimbal in caged position; and means for coupling said torque applying means to said gimbal until said gimbal is latched in caged position and for thereafter uncoupling said torque applying means, leaving said gimbal latched in caged position.

21. Apparatus for caging a gyroscope having a frame, a plurality of gimbals successively rotatably mounted one within the other, and a rotor pivotally mounted to the innermost of said gimbals, comprising: cam means operatively mounted to two of said gimbals, one of said two gimbals being mounted within the other, said cam means being effective to rotate one of said two gimbals into caged position with respect to the other of said two gimbals, means for latching said one, caged gimbal to said other gimbal while leaving said other gimbal free to rotate, cam means for rotating said other gimbal into caged position within its mounting, and means for latching said other gimbal in caged position to its mounting.

References Cited in the file of this patent

UNITED STATES PATENTS

| | | |
|---|---|---|
| 2,091,964 | Carter | Sept. 7, 1937 |
| 2,214,538 | Reid | Sept. 10, 1940 |
| 2,468,016 | Konet | Apr. 19, 1949 |
| 2,580,748 | Fillebrown | Jan. 1, 1952 |
| 2,674,891 | Konet et al. | Apr. 13, 1954 |
| 2,732,719 | Watson | Jan. 31, 1956 |